United States Patent [19]

Perchenek et al.

[11] Patent Number: 5,567,832
[45] Date of Patent: Oct. 22, 1996

[54] POLYMERIC MULTINARY AZANES, METHODS FOR THEIR PREPARATION AND THEIR USE

[75] Inventors: Nils Perchenek, Leverkusen; Hans-Peter Baldus, Burscheid; Josua Löffelholz; Martin Jansen, both of Bonn, all of Germany

[73] Assignee: Bayer AG, Leverkusen, Germany

[21] Appl. No.: 231,787

[22] Filed: Apr. 25, 1994

[30] Foreign Application Priority Data

May 3, 1993 [DE] Germany .................. 43 14 497.7

[51] Int. Cl.⁶ ................................. C07F 19/00
[52] U.S. Cl. .................. 556/28; 556/7; 556/8; 556/12; 556/27; 528/9; 528/10
[58] Field of Search .............. 556/7, 8, 12, 27, 556/28; 528/9,10

[56] References Cited

U.S. PATENT DOCUMENTS

| | | | |
|---|---|---|---|
| 4,886,860 | 12/1989 | Arai et al. | 525/474 |
| 4,946,809 | 8/1990 | Paciorek et al. | 556/173 |
| 5,198,152 | 3/1993 | Liimatta et al. | 252/389.31 |
| 5,233,066 | 8/1993 | Jansen et al. | 556/402 |

FOREIGN PATENT DOCUMENTS

| | | |
|---|---|---|
| 0389084 | 9/1990 | European Pat. Off. . |
| 0417526 | 3/1991 | European Pat. Off. . |
| 0424082 | 4/1991 | European Pat. Off. . |
| 0632643 | 11/1994 | European Pat. Off. . |

OTHER PUBLICATIONS

Wagner et al., Z. Anorg. Allg. Chem., vol. 620, No. 2, pp. 366–370 (1994).

D. C. Bradley and E. G. Torrible, "Metallo–Organic Compounds Containing Metal–Nitrogen Bonds", Candaian Journal of Chemistry, vol. 41, pp. 134–138 (1963).

Brown and Maya, "Ammonolysis Products of the Dialkylamides of Titanium, Zirconium, and Niobium as Precursors to Metal Nitrides", Journal of the American Ceramic Society, vol. 71, No. 1, pp. 78–82 (1988).

*Primary Examiner*—Porfirio Nazario-Gonzalez
*Attorney, Agent, or Firm*—Connolly & Hutz

[57] ABSTRACT

The present invention relates to polymeric multinary azanes built up from units of the general formula $[E(NR^1R^2)_a(NR^3)_{b/2}]$, wherein E may be B,Al,Ga,In,Si,Ge, Ti, Zr, Hf,V,Nb,Ta,Cr,Mo or W and $R^1,R^2,R^3$ may be H, $C_1$–$C_6$ alkyl, vinyl or phenyl; methods for the preparation of these polymers and their use as precursors for high-performance ceramics.

7 Claims, No Drawings

POLYMERIC MULTINARY AZANES, METHODS FOR THEIR PREPARATION AND THEIR USE

The present invention relates to polymeric multinary azanes built up from units of the general formula $[E(NR^1R^2)_a(NR^3)_{b/2}]$, wherein E may be B,Al,Ga,In,Si,Ge, Ti, Zr,Hf,V,Nb,Ta,Cr,Mo or W and $R^1,R^2,R^3$ may be H,$C_1$–$C_6$ alkyl, vinyl or phenyl; methods for the preparation of these polymers and their use as precursors for high-performance ceramics.

Within the range of oxide systems, the sol-gel process has gained supreme importance in the preparation of precursors for glasses and ceramic materials. The sol-gel process makes it possible to control particle size and shape; the products obtained are distinguished by homogeneous distribution of elements, high purity and uniform particle size. It appears desirable to use this process also for the synthesis of nitride or carbonitride systems, which have for some time been increasingly investigated for use as high-performance ceramics.

Hitherto the possibilities of preparing polymeric precursors for ceramic nitrides and carbonitrides by a method analogous to the sol-gel process for oxide systems have been little investigated.

According to Can. J. Chem. 41 (1963) 134, polymeric titanazanes are obtained by reacting Ti(NR$_2$)$_4$ with primary amines. In J. Am. Ceram. Soc. 71 (1988) 78, the corresponding binary nitrides are formed by the ammonolysis of dialkylamides of titanium, niobium or zirconium and the pyrolysis of the polymeric metal azanes obtained. Syntheses of polymeric azanes containing more than one transition metal are as yet unknown.

The synthesis of polymeric multinary azanes has been described to date only for the system Si—B—N:

According, to EP-A-389 084 and EP-A-0 424 082, soluble polyborosilazanes are obtained by the reaction of polysilazanes or polyorganosilanes with organoboron compounds. DE-A 4 107 108 discloses the preparation of oligo- or poly-borosilazanes by polymerization of heterometallic monomers with ammonia or alkylamines. These methods do not however allow the stoichiometry of the products optionally to be varied and the synthesis of the heterometallic monomers referred to moreover entails considerable expense.

The object of the present invention is the provision of novel, simple polymeric multinary azanes obtainable in high yields, with stoichiometry which can be regulated and having a homogeneous distribution of elements, as well as a method for the preparation of multinary nitride and carbonitride ceramics from these polymers.

The requirements are met by the following polymers, which are provided by the present invention. It relates to polymeric multinary azanes built up from units of the general formula $[E(NR^1R^2)_a(NR^3)_{b/2}]$, wherein E may be B,Al,Ga,In,Si,Ge,Ti,Zr,Hf,V,Nb,Ta,Cr,Mo or W and $R^1,R^2$, $R^3$ may be H,$C_1$–$C_6$ alkyl, vinyl or phenyl, characterised in that at least two of the named elements E are included, with the exception of the combination Si—B, and every atom E is coordinated by from three to six nitrogen atoms, wherein $0 \leq a \leq 6$, $1 \leq b \leq 6$, $3 \leq (a+b) \leq 6$ and a and b are whole numbers.

In a preferred method of operation, the polymeric multinary azanes according to the present invention are characterised in that the elements E are distributed homogeneously. In a more preferred method of operation, the distribution of elements is uniform at least to a resolution of 0.5 μm.

In a preferred method of operation, the polymeric multinary azanes according to the present invention are distinguished by having a low chloride content, amounting preferably to <100 ppm, in a more preferred method of operation, <20 ppm. The chloride content of the polymers is influenced by the chloride content of the amide units used in the preparation. A high chloride content has a negative effect on further processing. In particular, increased corrosion occurs in the pyrolysis of the polymers. In ceramic materials a high chloride content gives rise to worse sintering properties and a reduced final density.

The present invention also provides methods of preparation for the polymeric multinary azanes according to the present invention.

For the preparation of the polymeric multinary azanes according to the present invention, mixtures of amide units of the composition $E(NR^1R^2)_n$, wherein $3 \leq n \leq 6$, E may be B,Al,Ga,In,Si,Ge,Ti,Zr,Hf,V,Nb,Ta,Cr,Mo or W and $R^1$ may be H, $C_1$–$C_6$ alkyl, vinyl or phenyl, $R^2$ may be $C_1$–$C_6$ alkyl, vinyl or phenyl, are polymerised undiluted or in an aprotic organic solvent with ammonia or primary amines.

In a preferred method of operation, the reaction is carried out at temperatures of between −80° C. and 200° C., either undiluted or in an aprotic organic solvent which may be a $C_5$–$C_8$ alkane, an acyclic or cyclic ether or an alkyl aromatic compound, wherein the concentration of amides is >0.01 m.

The quantity and proportion of amides used in the mixture may be selected optionally, so that any desired stoichiometry in respect of the elements E can be set in the product.

The reactivity of the products may be selectively altered by varying the radicals $R^1$ and $R^2$ and selecting a solvent with suitable donor properties. The rate of ammonolysis of the amides can be adjusted and a homogeneous distribution of the elements E in the polymers thereby achieved. In addition the rate of polymerisation can be controlled, which facilitates control of the conditions of operation during preparation. The properties of the polymers according to the present invention may moreover be brought to the optimum state for further processing. In a preferred method of operation $R^1$ and $R^2$ are $C_1$–$C_4$ alkanes.

The viscosity of the solutions may be varied over a wide range by the concentration of the polymer in solution and allows the properties required for further processing to be brought to the optimum state.

The degree of cross-linking and the molar mass of the polymers according to the present invention can be controlled by the reaction temperature during polymerisation. Viscous oils can be obtained at low temperatures; at higher temperatures solids are formed.

For the preparation of powders the solvent is removed preferably under reduced pressure. Other usual drying processes are also suitable.

The invention also provides the use of the polymeric multinary azanes according to the present invention for the preparation of multinary nitrides or carbonitrides by pyrolysis in an atmosphere containing inert gas, $N_2$, $NH_3$ or primary amines at temperatures of from 400° to 2000° C.

In a preferred method of operation, the polymers are pyrolysed in an $NH_3$-stream at temperatures of from 400°–1000° C. for the synthesis of pure nitride material and are subsequently calcined in $N_2$ or an atmosphere of argon at temperatures of between 1400°–2000° C. to remove the residual hydrogen. Both stages are carried out under $N_2$ or Ar for the synthesis of carbonitride material.

The invention also provides for the use of the polymeric multinary azanes according to the present invention for the preparation of ceramic composites, films, fibres or coating by pyrolysis in an atmosphere containing inert gas, $N_2$, $NH_3$ or primary amines at temperatures of from 400° to 2000° C.

The choice of the polymerisation agent makes possible control of the properties of the polymers according to the present invention. Insoluble thermosetting plastics are formed during polymerisation with ammonia. Polymerisation with primary amines results in thermoplastics which are soluble in the usual organic solvents and which can be subjected to different forming processes, directly in solution or as liquefied material, for example, casting; spinning into fibres; drawing into films, preparation of coatings by various coating processes such as dip-coating or spin-coating.

The present invention is illustrated by the following examples, which should not be regarded as limiting the present invention.

EXAMPLE 1

Preparation of a polytitanosilazane with an Si/Ti ratio of 1: 1

Reaction equation:

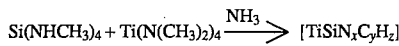

Test method:

50 ml $NH_3$ was added with stirring at $-78°$ C. to a solution of 8.88 g (0.06 mol) of $Si(NHCH_3)_4$ and 13.56 g (0.06 mol) of $Ti(N(CH_3)_2)_4$ in 500 ml of pentane. The reaction mixture was warmed up to room temperature over a period of 12 h. The solvent was distilled off under reduced pressure. 12.4 g of a yellow polytitanosilazane was obtained.

Analytical data for the polymer:

Infrared spectroscopy $[cm^{-1}]$: 3340 (m); 2920, 2810 (s); 2100 (w); 1550 (w); 1380 (m); 1100 (s); 920 (ss); 550 (m,vb). Powder diffractometry: amorphous.

Energy-dispersive X-ray analysis: homogeneous polymer, ratio Si:Ti=1.1.

5 g of the polymer was pyrolysed for a period of 12 h at 1000° C. in a stream of ammonia. 3.1 of a shiny black amorphous powder was obtained, equivalent to a yield of ceramic of 62%.

Analytical data for the pyrolysis product:

Infrared spectroscopy $[cm^{-1}]$: 3400 (w); 950 (s,b); 470 (m,b). Powder diffractometry: amorphous.

Energy-dispersive X-ray analysis: homogeneous distribution of elements at least up to the limit of resolution of 0.5 μm, ratio Si:Ti=1:1.

EXAMPLE 2

Preparation of a polytitanosilazane with an Si/Ti ratio of 2:1

Reaction equation:

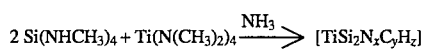

Test method:

30 ml $NH_3$ was added with stirring at $-78°$ C. to a solution of 6 g (0.04 mol) of $Si(NHCH_3)_4$ and 4.5 g (0.02 mol) of $Ti(N(CH_3)_2)_4$ in 300 ml of tetrahydrofuran.

The reaction mixture was warmed up to room temperature over a period of 12 h. The solvent was distilled off under reduced pressure. 7.1 g of a yellow polytitanosilazane was obtained.

Analytical data for the polymer:

Infrared spectroscopy $[cm^{-1}]$: 3400 (s); 2920, 2890 (m); 1620 (w); 1460, 1385 (m); 1185 (m);1040 (ss); 450 (m). Powder diffractometry: amorphous.

Energy-dispersive X-ray analysis: homogeneous polymer, ratio Si:Ti=2.1.

5 g of the polymer was pyrolysed for a period of 12 h at 1000° C. in a stream of ammonia. 2.75 g of a shiny black amorphous powder was obtained, equivalent to a yield of ceramic of 55%.

Analytical data for the pyrolysis product:

Infrared spectroscopy $[cm^{-1}]$: 3400 (w); 950 (ss); 460 (m,b) Powder diffractometry: amorphous Energy-dispersive X-ray analysis: homogeneous distribution of elements at least up to the limit of resolution of 0.5 μm, ratio Si:Ti=2:1.

EXAMPLE 3

Preparation of a polyzirconosilazane with an Si/Zr ratio of 1:1

Reaction equation:

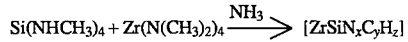

Test method:

50 ml $NH_3$ was added with stirring at $-78°$ C. to a solution of 7.4 g (0.05 mol) of $Si(NHCH_3)_4$ in 400 ml of pentane. After 5 min 12.8 g (0.05 mol) of $Zr(N(CH_3)_2)_4$ in 100 ml of pentane was added. The reaction mixture was warmed up to room temperature over a period of 12 h and stirred for a further 4 h. The solvent was distilled off under reduced pressure. 11.4 g of a yellow polyzirconosilazane was obtained.

Analytical data for the polymer:

Infrared spectroscopy $[cm^{-1}]$: 3350 (s); 2890, 2800 (s); 1470 (w); 1370 (m); 1260 (m); 1100 (ss); 800 (s); 520 (m); 470 (m). Powder diffractometry: amorphous.

Energy-dispersive X-ray analysis: homogeneous polymer, ratio Si:Zr=1.1.

5 g of the polymer was pyrolysed for a period of 12 h at 1000° C. in a stream of ammonia. 2.9 g of a shiny black amorphous powder was obtained, equivalent to a yield of ceramic of 58%. Analytical data for the pyrolysis product:

Infrared spectroscopy $[cm^{-1}]$: 3400 (w); 950 (s); 530 (m). Powder diffractometry: amorphous.

Energy-dispersive X-ray analysis: homogeneous distribution of elements at least up to the limit of resolution of 0.5 μm, ratio Si:Zr=1:1.

EXAMPLE 4

Preparation of a polyborosilazane with an Si/B ratio of 2:1

Reaction equation:

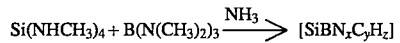

Test method:

50 ml $NH_3$ was added with stirring at $-78°$ C. to a solution of 10 g (0.067 mol) of $Si(NHCH_3)_4$ in 400 ml of pentane. Within 5 min solution of 4.83 g (0.0335 mol) of $B(N(CH_3)_2)_3$ in 100 ml of pentane was added dropwise. The reaction mixture was warmed up to room temperature over a period of 12 h and stirred for a further 4 h. The solvent was distilled off under reduced pressure. 10.3 g of a white polyborosilazane was obtained.

Analytical data for the polymer:

Infrared spectroscopy [cm$^{-1}$]: 3440 (s); 2890, 2810 (s); 1600 (w); 1460 (m); 1360 (m); 1210 (m); 1090, 940 (ss); 800, 470 (m). Powder diffractometry: amorphous.

5 g of the polymer was pyrolysed for a period of 12 h at 1000° C. in a stream of ammonia. 2.8 g of a white amorphous powder was obtained, equivalent to a yield of ceramic of 56%.

Analytical data for the pyrolysis product:

Infrared spectroscopy [cm$^{-1}$]: 3400 (w); 1350 (s); 1040 (ss); 460 (m). Powder diffractometry: amorphous.

EXAMPLE 5

Preparation of a polyaluminozirconazane

Reaction equation:

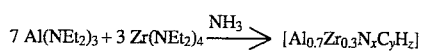
$$7\,Al(NEt_2)_3 + 3\,Zr(NEt_2)_4 \xrightarrow{NH_3} [Al_{0.7}Zr_{0.3}N_xC_yH_z]$$

Test method:

NH$_3$ was introduced at room temperature into a solution of 2.13 g (5.6 mmol) of Zr(NEt$_2$)$_4$ and 3.19 g (13.1 mmol) of Al(NEt$_2$)$_3$ in 100 ml of n-hexane. The pale yellow precipitate formed was filtered off and freed from adhering solvent under reduced pressure. 1.55 g of a pale yellow poly-aluminozirconazane was obtained.

Analytical data for the polymer:

Infrared spectroscopy [cm$^{-1}$]: 3270 (m); 2960, 2920, 2855 (s); 1535 (m); 1460 (m); 1380 (w); 1260 (s); 1095, 1020 (s); 800 (ss); 600 (s,b).

Powder diffractometry: amorphous.

1.5 g of the polymer was pyrolysed for a period of 72 h at 990° C. in a stream of ammonia. 0.8 g of a white amorphous powder was obtained, equivalent to a yield of ceramic of 53%.

Analytical data for the pyrolysis product:

Infrared spectroscopy [cm$^{-1}$]: 3430 (m); 1635 (m); 1390 (w); 1150 (w); 710 (s,b).

Powder diffractometry: amorphous.

Energy-dispersive X-ray analysis: homogeneous distribution of elements at least up to the limit of resolution of 0.5 μm, ratio Al:Zr≈2:1.

EXAMPLE 6

Preparation of a polyaluminotitanozirconazane

Reaction equation:

$$6\,Al(NEt_2)_3 + 3\,Ti(NEt_2)_4 + Zr(NEt_2)_4 \xrightarrow{NH_3} [Al_{0.6}Ti_{0.3}Zr_{0.1}N_xC_yH_z]$$

Test method:

NH$_3$ was introduced at room temperature into a solution of 2.92 g (12 mmol) of Al(NEt$_2$)$_3$, 2.02 g (6 mmol) of Ti(NEt$_2$)$_4$ and 0.76 g (2 mmol) of Zr(NEt$_2$)$_4$ in 100 ml of n-heptane. The brownish-red precipitate formed was filtered off and freed from adhering solvent under reduced pressure. 2.15 g of a brownish-red polyaluminotitanozirconazane was obtained.

Analytical data for the polymer:

Infrared spectroscopy [cm$^{-1}$]: 3290 (m); 2960, 2920, 2855 (s); 2000 (w); 1550 (s,sh); 1465 (w); 1380 (w); 1260 (s); 1090, 1020 (s); 800 (ss); 600 (s,vb).

Powder diffractometry: amorphous.

2.1 g of the polymer was pyrolysed for a period of 72 h at 995° C. in a stream of ammonia. 1.4 g of a black amorphous powder was obtained, equivalent to a yield of ceramic of 66%.

Analytical data for the pyrolysis product:

Infrared spectroscopy [cm$^{-1}$]: 3435 (s); 1635 (m); 1400, 1385 (w); 740 (ss,sh).

Powder diffractometry: amorphous.

Energy-dispersive X-ray analysis: homogeneous distribution of elements at least up to the limit of resolution of 0.5 μm.

EXAMPLE 7

Preparation of a polytitanovanadozirconazane

Reaction equation:

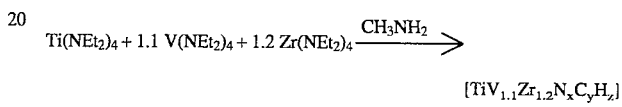
$$Ti(NEt_2)_4 + 1.1\,V(NEt_2)_4 + 1.2\,Zr(NEt_2)_4 \xrightarrow{CH_3NH_2} [TiV_{1.1}Zr_{1.2}N_xC_yH_z]$$

Test method:

Methylamine was introduced at room temperature into a solution of 3.37 g (10 mmol) of Ti(NEt$_2$)$_4$, 3.70 g (11 mmol) of V(NEt$_2$)$_4$ and 4.60 g (12 mmol) of Zr(NEt$_2$)$_4$ in 100 ml of tetrahydrofuran. The blackish-green precipitate formed was filtered off and freed from adhering solvent under reduced pressure. 3.71 g of a blackish-green polytitanovanado-zirconazane was obtained.

Analytical data for the polymer:

Infrared spectroscopy [cm$^{-1}$]: 3255 (m); 2960 (s), 2855 (ss,sh); 2760 (s), 2100 (w); 1660 (w); 1575 (m); 1050, 1465, 1400, 1365 (m); 1260 (s); 1095, 1025 (s); 800 (s); 600 (s,vb).

Powder diffractometry: amorphous.

EXAMPLE 8

Preparation of a polytitanoborazane

Reaction equation:

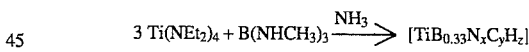
$$3\,Ti(NEt_2)_4 + B(NHCH_3)_3 \xrightarrow{NH_3} [TiB_{0.33}N_xC_yH_z]$$

Test method:

NH$_3$ was introduced at 90° C. into a solution of 9.7 g (29 mmol) of Ti(NEt$_2$)$_4$ and 1.2 g (12 mmol) of B(NHCH$_3$)$_3$ in 100 ml of heptane. The black precipitate formed was filtered off and freed from adhering solvent under reduced pressure. 3.53 g of a black polytitanoborazane was obtained.

Analytical data for the polymer:

Infrared spectroscopy [cm$^{-1}$]: 3290 (m); 2960, 2920, 2855 (s); 1640 (m); 1380 (w); 1100 (s,b); 600 (m,b).

Powder diffractometry: amorphous.

3.5 g of the polymer was pyrolysed for a period of 16 h at 1600° C. in a stream of nitrogen. 1.75 g of a black powder was obtained, equivalent to a yield of ceramic of 50%.

Analytical data for the pyrolysis product:

Infrared spectroscopy [cm$^{-1}$]: 3435 (s); 1650 (m); 1385 (m): 1150 (m,sh); 800 (w); 660, 600 (w).

Powder diffractometry: largely amorphous; a few weak very broad peaks indicate a cubic unit cell with a=4.26 Å. Energy-dispersive X-ray analysis: no segregation observed, homogeneous distribution of elements at least up to the limit of resolution of 0.5 μm.

EXAMPLE 9

Preparation of a polytitanoborazane

Reaction equation:

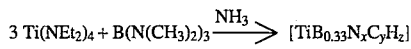
$$3\ Ti(NEt_2)_4 + B(N(CH_3)_2)_3 \xrightarrow{NH_3} [TiB_{0.33}N_xC_yH_z]$$

Test method:

A mixture of 10.47 g (31 mmol) of $Ti(NEt_2)_4$ and 1.25 g (9 mmol) of $B(N(CH_3)_2)_3$ was heated to 200° C. in an atmosphere of ammonia. 2.9 g of a brownish-black polytitanoborazane was formed.

Analytical data for the polymer: p Infrared spectroscopy [$cm^{-1}$]: 3290 (m); 2960, 2920, 2855 (s); 1640 (m); 1380 (w); 1100 (s,b); 600 (m,b).

Powder diffractometry: amorphous.

2.9 g of the polymer was pyrolysed for a period of 12 h at 1000° C. in a stream of ammonia. 2.0 g of a black powder was obtained, equivalent to a yield of ceramic of 69%.

Analytical data for the pyrolysis product:

Infrared spectroscopy [$cm^{-1}$]: 3440 (s); 1635 (m); 1400, 1385 (m); 1100 (m,sh); 795 (w); 660, 600 (w); 470 (w).

Powder diffractometry: amorphous.

Energy-dispersive X-ray analysis: no segregation observed, homogeneous distribution of elements at least up to the limit of resolution 0.5 μm.

EXAMPLE 10

Preparation of a polytitanoborazane

Reaction equation:

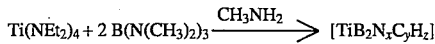
$$Ti(NEt_2)_4 + 2\ B(N(CH_3)_2)_3 \xrightarrow{CH_3NH_2} [TiB_2N_xC_yH_z]$$

Test method:

A mixture of 6.8 g (20 mmol) of $Ti(NEt_2)_4$ and 5.8 g (40 mmol) of $B(N(CH_3)_2)_3$ was heated to 200° C. in an atmosphere of methylamine. 3.40 g of a brownish-black polytitanoborazane was formed.

Analytical data for the polymer:

Infrared spectroscopy [$cm^{-1}$]: 3290 (m); 2960, 2920, 2855 (s); 1640 (m); 1380 (w); 1100 (s,b); 600 (m,b).

Powder diffractometry: amorphous.

3.4 g of the polymer was pyrolysed for a period of 72 h at 800° C. in an atmosphere of argon. 1.85 g of a black powder was obtained, equivalent to a yield of ceramic of 55%.

Analytical data for the pyrolysis product:

Infrared spectroscopy [$cm^{-1}$]: 3425 (s); 1635 (m); 1400, 1385 (s); 1100 (s,sh); 790 (w); 660, 600 (w); 470 (w).

Powder diffractometry: amorphous.

Energy-dispersive X-ray analysis: no segregation observed, homogeneous distribution of elements at least up to the limit of resolution of 0.5 μm.

What is claimed is:

1. A polymeric multinary azane built up from units of the general formula $[E(NR^1R^2)_a(NR^3)_{b/2}]$, wherein E is selected from B, Al, Ga, In, Si, Ge, Ti, Zr, Hf, V, Nb, Ta, Cr, Mo or W and $R^1$, $R^2$, $R^3$ are selected from H, $C_1$–$C_6$ alkyl, vinyl or phenyl, wherein at least two of the named elements E are included, with the exception of the combination Si—B, and every atom E is coordinated by from three to six nitrogen atoms, wherein $0 \leq a \leq 6$, $1 \leq b \leq 6$, $3 \leq (a+b) \leq 6$ and a and b are whole numbers.

2. A polymeric multinary azane according to claim 1, wherein the elements E are distributed homogeneously.

3. A polymeric multinary azane according to claim 1, wherein chloride content of the polymeric multinary aznae is >100 ppm.

4. A polymeric multinary azane according to claim 3, wherein the chloride content of the polymeric multinary is >20 ppm.

5. A method for the preparation of the polymeric multinary azane according to claim 1, wherein mixtures of amide units of the composition $E(NR^1R^2)_n$, wherein $3 \leq n \leq 6$, E is selected from B, Al, Ga, In, Si, Ge, Ti, Zr, Hf, V, Nb, Ta, Cr, Mo or W and $R^1$ is selected from H, $C_1$–$C_6$ alkyl, vinyl or phenyl, $R^2$ is selected from $C_1$–$C_6$ alkyl, vinyl or phenyl, are polymerized undiluted or in an aprotic organic solvent with ammonia or primary amines.

6. A method for the preparation of the polymeric multinary azane according to claim 5, wherein the polymerization is carried out at temperatures of between −80° and 200° C. either undiluted or in an aprotic organic solvent which is selected from a $C_5$–$C_8$ alkane, an acyclic or cyclic ether or an alkyl aromatic compound, wherein the concentration of amides is >0.01 m.

7. A polymeric multinary azane according to claim 2, wherein the chloride content of the polymeric multinary azane is >100 ppm.

* * * * *

UNITED STATES PATENT AND TRADEMARK OFFICE
CERTIFICATE OF CORRECTION

PATENT NO. : 5,567,832
DATED : Oct. 22, 1996
INVENTOR(S) : Perchenek et al.

It is certified that error appears in the above-indentified patent and that said Letters Patent is hereby corrected as shown below:

In Column 8, line 24, insert --the-- after "wherein"; Column 8, line 24, "aznae" should be --azane-- and in Column 8, line 25, ">100 ppm" should be --<100 ppm--. In Column 8, line 27, insert --azane-- after "multinary" and in Column 8, line 28, ">20 ppm" should be --<20 ppm--. In Column 8, line 47, ">100 ppm" should be --<100 ppm--.

Signed and Sealed this

Thirty-first Day of December, 1996

*Attest:*

BRUCE LEHMAN

*Attesting Officer*     *Commissioner of Patents and Trademarks*